Figure 1:
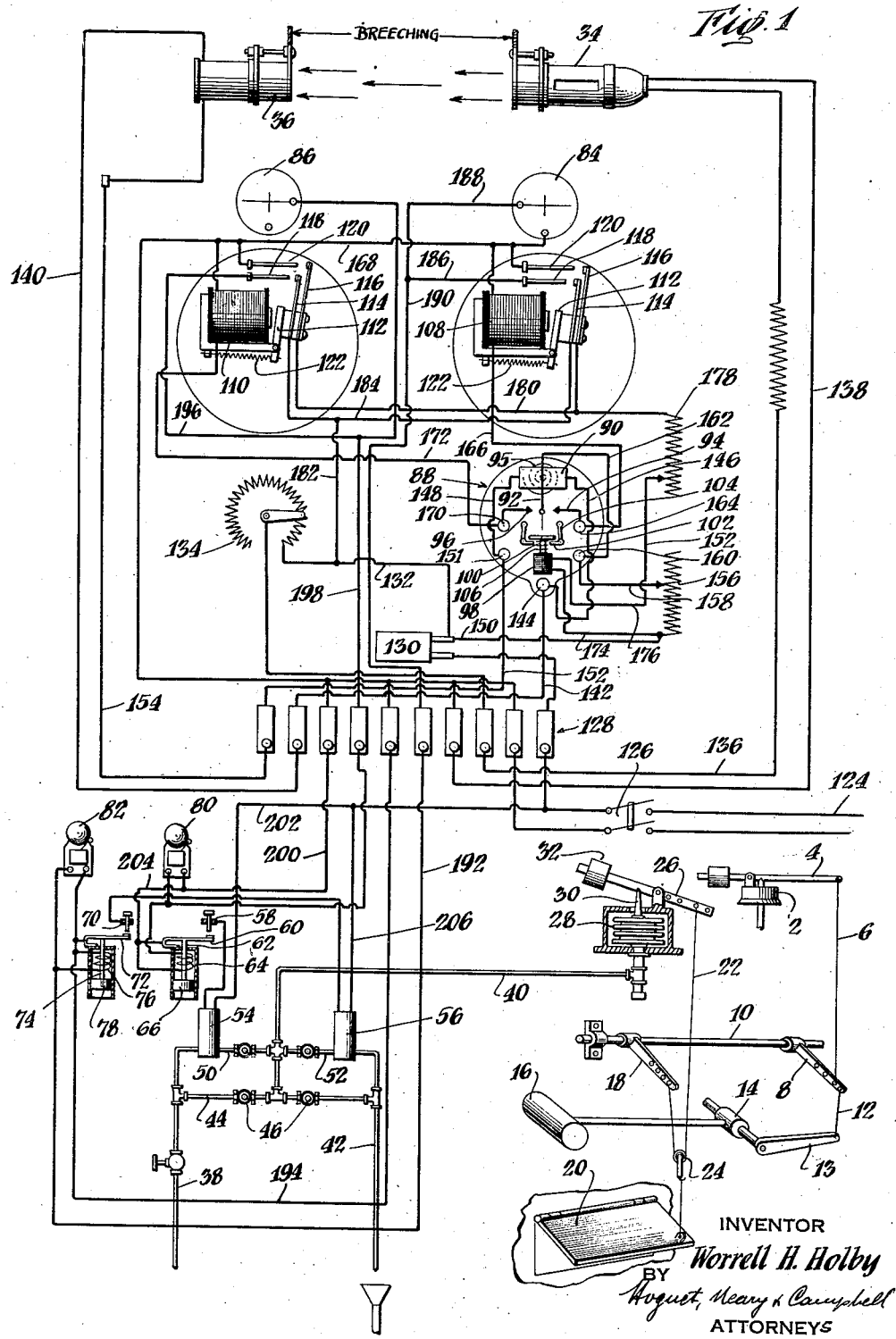

April 9, 1940.  W. H. HOLBY  2,196,700
FIRE CONTROL FOR STEAM PLANT OPERATION
Filed Oct. 17, 1936  2 Sheets-Sheet 1

INVENTOR
Worrell H. Holby
BY
Huguet, Meary & Campbell
ATTORNEYS

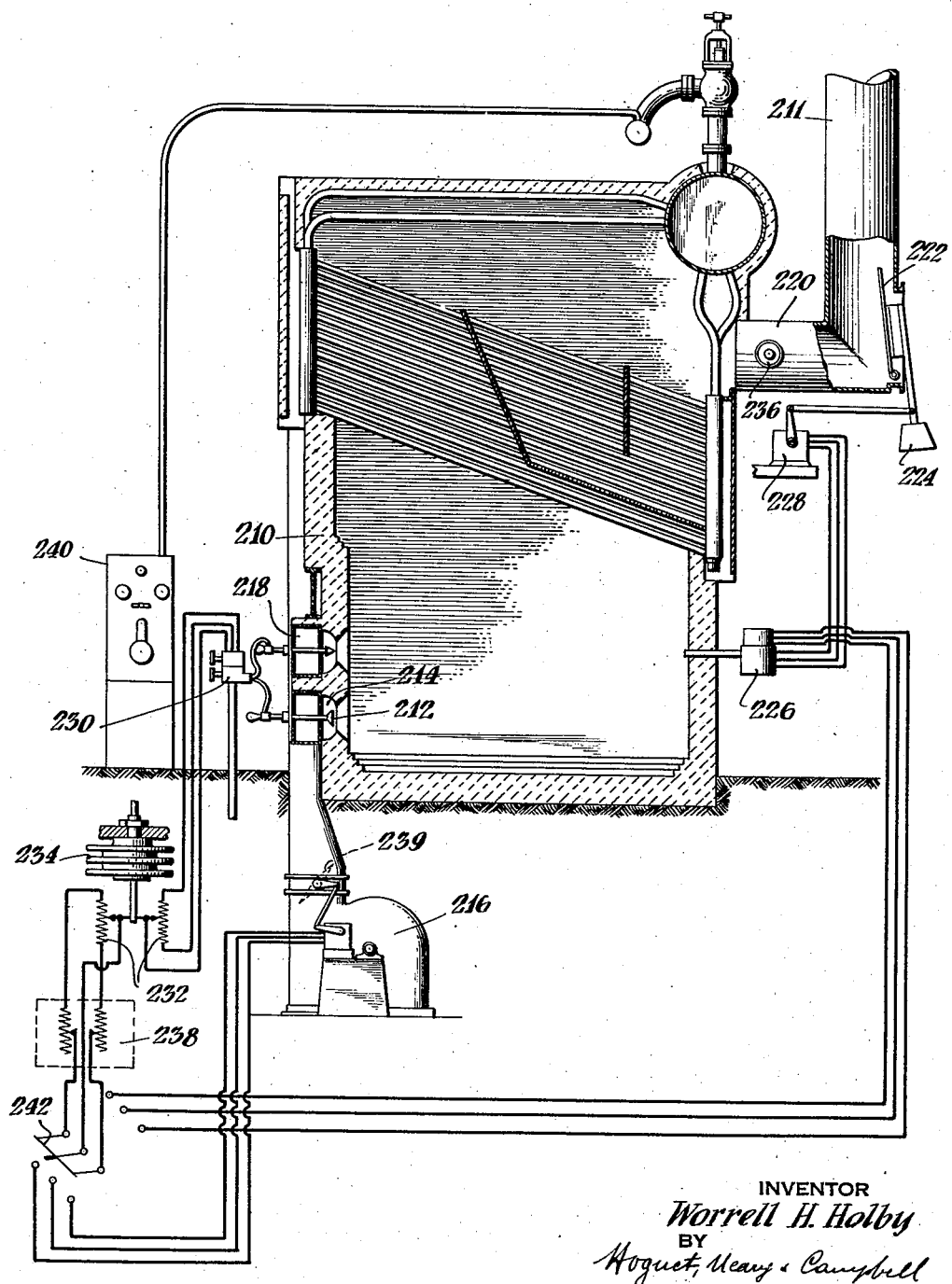

Patented Apr. 9, 1940

2,196,700

UNITED STATES PATENT OFFICE 2,196,700

FIRE CONTROL FOR STEAM PLANT OPERATION

Worrell H. Holby, New Rochelle, N. Y.

Application October 17, 1936, Serial No. 106,260

18 Claims. (Cl. 236—14)

This invention relates to control systems and particularly to systems which are responsive to changes in conditions such as light, heat, weight, pressure, motion, current flow or the like to maintain the operation of a device substantially uniform and to compensate for the influence which such changes may have upon the device.

Control systems are known wherein mechanism is set to maintain uniform operation of a device under a given set of conditions. Typical of such systems are furnace regulators which are arranged to operate an air damper and an oil valve simultaneously in response to changes in boiler pressure or room temperature to increase or decrease the rate of combustion so as to compensate for changes which have taken place. However, the elements of such systems are ordinarily so fixed that although other factors vary, as when the temperature and viscosity of the oil change or the temperature or barometric pressure of the air vary, the relation of the damper opening to the valve opening nevertheless remains constant with the result that the efficiency and operation of the device may be altered and uniform operation cannot be maintained.

In other systems for the control of other types of apparatus changes in electrical current, wind velocity, direction, weight, humidity or other factors may cause the system to operate improperly despite the compensating effects of control mechanism.

In accordance with the present invention, means are provided for varying the relation between the elements of a control system in response to a plurality of conditions, so that the operation of a control system is made more flexible and sensitive and more uniform and efficient operation of the device is secured.

One of the objects of the present invention is to provide a novel type of control system responsive to variations in conditions under which a device operates.

Another object of the invention is to provide means for automatically varying the relation between the means for controlling the operation of a device.

A further object of the invention is to provide means responsive to one or more conditions for altering the operation of one or more elements of a control system which are responsive to different conditions.

As hereinafter described, a typical application of the invention is in connection with mechanism for controlling combustion devices such as furnaces or boilers and a particular object of the invention is to vary the operation of a system controlling combustion operations to prevent undesired smoking of the device.

These and other objects and features of the invention will appear from the following description of a typical embodiment of the invention as applied to a system for controlling combustion operations, but it should be understood that the invention is not limited to this particular application thereof, but may be employed in any of a great variety of systems and for controlling various electrical, mechanical or chemical devices as desired.

In the drawings:

Figure 1 is a diagrammatic representation of a typical form of the invention as applied to a furnace or boiler, including electrical circuits and devices for actuating regulating means for the boiler, and Figure 2 is a vertical sectional view of a boiler and control system embodying the present invention with parts illustrated diagrammatically.

In that form of the invention illustrated in Fig. 1, control mechanism is shown, wherein a pressure actuated device 2, which may be associated with a boiler or the like, is provided with a lever 4 connected by a link or chain 6 to an arm 8 secured to a shaft 10. A link 12 extends from the arm 8 to an operating arm 13 of an oil control valve 14 for actuating the valve to vary the supply of oil to an oil burner 16. A second arm 18 is carried by the shaft 10 and connected to a damper 20 for opening and closing the damper by which air for combustion is admitted to the combustion chamber.

If the connection between the arm 18 and the damper 20 were fixed, as in conventional constructions, the valve 14 and the damper 20 would operate simultaneously and in the same relation under all conditions of operation. Changes in barometric pressure or changes in the velocity or direction of the wind which frequently occur, then would cause either more or less air to be drawn in through the damper opening without a corresponding change in the position of the damper or the amount of oil delivered. Under these conditions, either more or less smoke would be produced than is desirable for the most efficient and satisfactory operation of the burner and boiler. Furthermore, these changes would take place without the knowledge of the fireman, who seldom can see the top of the stack, so that violations of smoke ordinances would occur despite the operation of the control mechanism.

The present invention overcomes this difficulty by the provision of means for varying the relation between the oil control valve and the damper 20 in response to the amount of smoke produced while permitting continued control of these elements by the pressure responsive element 2. As shown, such means may include a flexible chain 22 connected to the arm 18 and extending beneath a pulley 24 secured to the damper 20 and passing to the pivoted arm 26 of a control element 28. The control element illustrated is in the form of a sylphon bellows having a member 30 movable thereby to raise the left hand end of arm 26 against the action of weight 32, or to permit lowering thereof. Raising and lowering of the opposite end of the pivoted arm by the action of the control element serves to shorten and lengthen the connection between the arm 18 and the damper 20, changing the relation between the arm and the damper and the relation between the oil valve and the damper in response to a factor which in this case is the transparency or density of the stack gases or smoke. However, such changes do not interfere with the normal operation of the pressure actuated device or the movement of the arms 8 and 18 in maintaining the desired boiler pressure.

The operation of the control element 28 is rendered responsive to the amount or density of the smoke by smoke responsive means, shown in the drawing as a source of light 34 which is directed onto a photoelectric or other light sensitive cell 36 positioned in the breeching of the boiler or in the stack or in any other suitable position to respond to combustion gases passing between the light and the cell. The control system may also include indicating means such as a light, an audible signal, a recorder or any one or more devices of this character located in the boiler room or the engineer's office so that the fireman and the engineer will be continually advised of the smoke condition. In accordance with the present invention, these signals and the control element 28 are actuated in a variable manner in response to not only the existence of smoke or an undesired condition, but also in response to the extent or degree in which the condition varies from a predetermined setting.

The means controlled in response to the smoke condition and employed for actuating the Sylphon bellows or other control element 28 may include an electrical circuit, or mechanical or fluid operated means, but for purposes of illustration is herein shown as fluid operated means supplied with water from the city water mains through the supply line 38. The water is passed to and from the bellows 28 through a conduit 40 and passes to the drain through a discharge line 42. A by-pass 44 extends directly from the supply line to the discharge line and is controlled by valves 46. Preferably these valves are adjusted to permit continuous but slight flow of water from the conduit 40 and the bellows 28 to the discharge line 42, so that the bellows tend to collapse and the damper 20 tends to open, thereby avoiding the creation of excess smoke in the event of failure in either the water or the electrical supply.

The conduit 40 is also connected to the supply line by a supply pipe 50 and is connected to the discharge line by a discharge pipe 52. Control valves 54 and 56 in pipes 50 and 52 respectively, are actuated in response to the operation of the smoke responsive means by solenoids or the like to admit water to or to permit the draining of water from the bellows 28 so that the bellows will be expanded or allowed to contract in response to changes in the density of the smoke, thereby changing the position of the air damper 20 to overcome or correct the condition.

The circuit for energizing the solenoid associated with control valve 54 in the supply pipe 50 includes a time delay relay of suitable type which as illustrated includes a stationary contact 58 engageable by a movable contact 60 actuated by the movable core 62 of a solenoid 64. In this construction, a dash pot 66 is provided for damping the movement of the core so that contact 60 on engaging fixed contact 58 will be retained in engagement therewith for a predetermined interval of time, say one-half second or so, to allow a predetermined amount of liquid to pass to the bellows 28. Similarly, the circuit for actuating control valve 56 in the discharge pipe includes a fixed contact 70 and a movable contact 72 actuated by the movable core 74 of solenoid 76, a dash pot 78 being provided to dampen the movement of the core and movable contact 72 to allow a predetermined amount of liquid to drain from the bellows.

The solenoids 64 and 76 are included in a signalling and control circuit for actuating audible signalling devices in the form of bells 80 and 82 and visible signal devices in the form of lights 84 and 86, as well as the control valves 54 and 56. The bells, lights and control valves are preferably operated in a manner which varies not only with the character but also with the amount of deviation of the device from those conditions which it is desired to maintain. Thus the bell 82 and the light 84 as well as the control valve 56 through which liquid drain from the bellows 28 may be actuated at frequent intervals when considerable smoke is being produced, whereas the frequency is decreased as the condition is corrected by collapsing of the bellows and opening of the damper until a point is reached at which the desired condition is restored and the visible and audible signals cease to operate. When the amount of smoke produced is less than is consistent with efficient operation the other bell 80 and the other light 86 as well as the valve 54 which permits the flow of liquid to the bellows 28 are actuated so that the bellows are expanded and the damper closed until the condition is corrected, the frequency of operation of the bell 80 and light 86 indicating the extent of deviation from the desired conditions or the amount of excess air being admitted to the combustion chamber. The fireman and others concerned may be advised in this way when the amount of smoke is either more or less than desired and to what extent, while the control mechanism functions to overcome the undesired condition.

Any suitable means may be employed for controlling operation of the signals and control valves to energize the circuit in successive intervals or in other ways which vary with the amount of smoke passing through the stack. The means illustrated includes a conventional galvanometer type of instrument indicated generally at 88 having a coil 90 rotatable between fixed poles of a permanent magnet (not shown) and movable in response to the amount of current passing through the coil. Current from the light sensitive cell 36 is passed through the coil so that its movement varies with the amount of light from the source 34 which falls on the cell and therefore varies with the density of the smoke passing between the source of light 34 and the cell 36. The coil is provided with a contact arm 92 for engaging one or the other of the fixed contacts 94 and 96 of the instrument upon movement of the coil a predetermined distance to one side or the other from a central position. A spring 95 or other suitable biasing means is connected to the coil 90 and serves to hold the coil in position with contact 92 midway between contacts 94 and 96 when a predetermined amount of current corresponding to the desired smoke condition is passing through coil 90. When too much smoke is produced the current passing from light sensitive cell 36 to coil 90 is insufficient to hold contact 92 in its central position against the action of biasing spring 95 and the contact 92 is caused to engage the contact 94. On the other hand, when too little smoke is produced, the current flow in coil 90 is increased overcoming the action of spring 95 so that contact 92 is moved into engagement with contact 96. The speed at which contact 92 is moved to engage either contact 94 or 96 depends upon the current flow in coil 90 so that the contact is moved rapidly from its central position toward one of the fixed contacts when the smoke condition varies greatly from that for which the instrument 88 is adjusted but moves toward the fixed contacts only slowly when the condition deviates only slightly from that desired.

The energizing of the signalling and control circuit, also serves to actuate a resetting element of the instrument to return the contact 92 and coil 90 to their central position breaking the signalling and control circuit. For this purpose a coil 98 is included in the circuit and provided with a movable core 100, the upper end of which has lateral extensions for engaging the inturned ends 102 of pivoted centering members 104. The centering members are positioned to swing inwardly toward each other and to engage the movable contact 92 so as to move it away from the stationary contacts to a central or intermediate position, which in a typical case, may be midway between the fixed contacts. In returning the movable contact to its central position, the resetting device not only breaks the signalling and control circuit, but also breaks the circuit including solenoid 98 so that the resetting device itself is deenergized and the core 100 moved upward away from the inturned ends 102 of the pivoted elements 104 by the operation of a spring 106. Thereafter the movable contact 92 will remain in its mid-position if the undesired condition is corrected and the current flow in coil 90 balances spring 95, but it will again swing to one side or the other to engage contact 94 or 96 if the undesired condition persists and the current passing through the coil 90 from the light sensitive cell 36 continues to be either more or less than sufficient to overcome the action of the biasing means 95. If considerably more or considerably less current is passing through the coil 90 than is required to hold contact 92 in its central position due to a marked departure from the desired conditions, the contact 92 will be moved rapidly into engagement with one of the fixed contacts upon release by the resetting means and the signalling and control circuit will be made and broken rapidly. However, if the condition varies only slightly from that desired, the movement of contact 92 toward a fixed contact will be relatively slow and the signalling and control circuit will be reenergized less frequently. Thus the frequency of operation of the signals gives an accurate indication or measure of the extent of deviation of conditions from those desired.

The elements actuated by current from the light sensitive cell serve to actuate the relays 108 and 110 which control the flow of current in the signalling and control circuit including the signal lights 84 and 86, the bells 82 and 80, and the solenoids 76 and 64 which actuate the contacts 72 and 60 to open one or the other of the control valves 56 and 54.

The relays 108 and 110 are similar in construction and each comprises a coil and a pivoted armature 112 carrying two contacts 114 and 116, separated by insulation and movable into engagement with fixed contacts 118 and 120 respectively. A spring 122 normally holds the movable contacts out of engagement with the fixed contacts so that when the circuit for energizing the relay is broken, the circuits including the signalling devices and the contact operating solenoids 64 and 76 are also broken.

The elements of the control system described are connected to a source of power by suitable electrical connections which, as shown in the drawings, include a power line 124 controlled by a switch 126. The power line leads to a junction box 128 provided for convenience in wiring the mechanism and the conductors from various parts of the system lead to the junction box. A switch 130 also may be included in the junction box but neither this switch nor the switch 126 is essential to the operation of the device.

Current for lighting the source of light 34 which cooperates with the light sensitive cell 36 passes from the power line and the junction box through switch 130 and conductor 132 to a rheostat 134. From the rheostat current flows again through the junction box and through conductor 136 to a source of light 34, flowing back through the conductor 138 to the junction box and the opposite side of the power line. Adjustment of the rheostat 134 controls the flow of current in the light circuit and the brightness of light 34 so that the amount of light falling on the cell 36 may be varied readily. This adjustment may be made to cause the desired flow of current through the coil 90 of instrument 88 thus rendering it unnecessary to vary the adjustment of biasing spring 95 to retain contact 92 in its central position.

Light from the source 34, falling upon the light sensitive cell 36, varies the amount of current passing through a circuit including the cell. This current passes from the cell 36 through a conductor 140 to the junction box and thence through the conductor 142 to the binding post 144 on the instrument 88. Within the instrument current passes from the binding post 144 through the conductor 146 to the coil 90 and thence through the conductor 148 to a second binding post 15 on the instrument from which current flows through conductor 152 to the junction box and conductor 154 to the opposite side of the light sensitive cell.

Current for actuating the relays 108 and 110 upon movement of the contact 92 by the coil 90 passes from the power line 124 through the junction box and switch 130 to the conductor 150 and variable resistance 156. From the resistance current passes through the conductor 158 to the binding post 160 on the instrument 88 and thence through conductor 162 to the contact 92 carried by the coil. Upon movement of the coil and engagement of the contact 92 with the stationary contact 94 current passes through the binding post 164 and conductor 166 to the coil of relay 108. From the relay current returns through the conductor 168 and the junction box to the opposite side of the line.

In a similar way, engagement of contact 92 with the stationary contact 96 causes current to flow through the contact 96 and the binding post 170 to conductor 172 and the coil relay 110, returning through the conductor 168 and the junction box to the line.

The resetting mechanism for the movable contact 92 is actuated upon engagement of the contact with either of the contacts 94 and 96, by current passing from the line and switch 130 through conductor 150 and the conductor 174 to the coil 98. From the coil current passes through the conductor 176 and variable resistance 178 to conductor 180 and to the movable contact 116 of the relay 108 or 110, and returns through the cooperating relay contact 120 connected to the return line 168.

The signalling and control elements of the system including the bells 80 and 82, the lights 84 and 86 and the solenoids 64 and 76 which control operation of the control valves 54 and 56, are actuated by the passage of current flowing from switch 130, through conductors 132 and 182 to a conductor 184 connected to the movable contacts 114 of each of the relays 108 and 110. When the relay 108 is energized, the contact 114 thereof, engages stationary contact 118 and current passes therefrom through conductor 186 and 188 to the light 84. Current returns from the light 84 through the conductor 168 and the junction box to the opposite side of the line. At the same time current from conductor 186 passes through the conductor 190 and the junction box to conductor 192 connected to the bell 82 and to the solenoid 76. From these members current returns through conductor 194 to the junction box and the opposite side of the line.

In a similar way, upon operation of the relay 110, current passes from the conductor 184 through the contact 114 and 118 of relay 110 to the conductor 196 and thence to the light 86 from which current returns through the conductor 168 and the junction box to the opposite side of the line. At the same time current for actuating the bell 80 and the solenoid 64 passes from the conductor 196 through the conductor 198 to the bell 80 and the solenoid returning to the junction box and the opposite side of the line through conductor 200.

Current for operating the solenoids which actuate the control valves 54 and 56 passes directly from the line through the conductor 202 to the solenoid of valve 54 and through the stationary contact 58 and the movable contact 60 associated therewith, to the conductor 204 and back to the junction box and the opposite side of the line. In a like manner current passes from the line through conductor 202 and branch conductor 206 to the solenoid of valve 56 and the stationary contact 70 associated therewith. Thence current passes through movable contact 72 and conductor 194 to the opposite side of the line.

In the operation of the system described for controlling a furnace or boiler to maintain uniform operation thereof, and at the same time to prevent the formation of objectionable amounts of smoke, the pressure control device 2 on the boiler is regulated by adjustment of the weight 3 or other means to cause the arm 4 to be raised and lowered in response to changes in pressure of the boiler as in the usual operation of devices of this character. Movement of the arm 4 serves to raise and lower the arm 8 with changes in pressure within the boiler so that the valve 14 controlling the flow of oil to the burner 16 is operated to increase or decrease the amount of fuel supplied to maintain a uniform boiler pressure. Movement of the lever 4 and arm 8 also serves to raise or lower the arm 18 so that the damper door 20 is operated simultaneously with the operation of the oil valve 14 to maintain the desired combustion within the boiler.

In normal operation of a boiler fired by oil it has been found that the most efficient combustion is accompanied by the production of substantial amounts of smoke which would violate many of the ordinances with respect to this subject. Therefore, while it is necessary to reduce the amount of smoke, it is not desirable or even necessary that it be eliminated altogether. The system may be adjusted accordingly to permit a slight haze to be produced and this condition may be maintained by the smoke response means including the light 34 and the cell 36. The current passing through the circuit including cell 36 and the conductors 140 and 154 connected to coil 90 of the instrument 88, may be regulated by adjustment of the rheostat 134 to vary the brightness of the light 34. The desired smoke condition to be maintained is thus established and the current flow in coil 90 regulated to retain the contact 92 carried by the coil in its central position against the action of biasing spring 95. Thereafter if the amount of smoke produced is more than that for which the system is adjusted the current flowing through the coil 90 falls below that necessary to overcome the action of the biasing spring 95 and the spring moves the contact 92 to engage the stationary contact 94, completing a circuit through 118 and 120, respectively. The signal light 84 is then lighted and the bell 82 is caused to ring. At the same time the solenoid 76 is energized causing the contact 72 to engage the stationary contact 70 to actuate the valve 56. Upon operation of the valve 56 liquid is permitted to drain from the Sylphon bellows 28, through the conduit 40 and valve 56 to the discharge pipe 52 and 42 and the bellows contract, lowering the left hand end of arm 26 and raising the right hand end thereof to open the damper 20 and admit more air to the combustion chamber so that the amount of smoke produced will be decreased.

While the signalling and control elements of the system are actuated upon engagement of the contact 92 with contact 94, they are permitted to operate only momentarily since the resetting coil 94 is included in the circuit with the signalling and control elements and when energized, the coil 98 is drawn downward to rock the resetting members 104 about their pivots engaging the contact 92 to move it again to its central position. In this way, the relay 108 is deenergized permitting the spring 122 to move the contacts 114 and 116 out of engagement with the contacts 118 and 120 to break the signalling and control circuit almost as soon as it is completed. The bell, therefore, is actuated only momentarily and the light flashes for only an instant upon each movement of the contact 92 into engagement with the contact 94. However, the dashpot 78, associated with the solenoid 76, serves to maintain the contacts 70 and 72 in engagement for a longer period, say one-half second, so that a predetermined amount of liquid may drain from the Sylphon bellows.

If the undesired smoke condition continues after the first momentary energizing of the signalling and control circuit, the current flowing in the coil 90 will cause the contact 92 to be deflected again to give another signal. The rapidity with which the contact 92 swings from its central position to engage contact 94 again depends upon the amount of current passing through the coil 90 and therefore the frequency of the signals serves as an indication of the extent to which the undesired condition deviates from that which the system is adjusted to maintain, whereas the frequency of operation of the valve 56 determines the rate of flow of water from the Sylphon bellows and the rapidity and extent to which the damper is opened. If the signals and impulses come frequently and exceed the rate of one every one-half second, in the example suggested, the valve 56 will remain open and the damper 20 will open quickly. The objectionable condition is thus quickly adjusted, the rate of adjustment becoming slower as the desired condition is approached and the amount of air entering the combustion chamber of the boiler becomes sufficient to reduce the smoke produced to that for which the system is set. The movement of the contact 92 into engagement with contact 94 and the operation of signals and the control valve 54 will then become less and less frequent until finally the condition has been fully corrected and the signals cease to operate or operate only at infrequent intervals.

In the event too much air is admitted so that the amount of smoke produced is less than that consistent with efficient operation of the boiler, the current flowing through the circuit including the light sensitive cell increases beyond that required to overcome the biasing spring 95 and the coil swings in the opposite direction so that contact 92 engages contact 96 energizing the relay 110. The light 86 and bell 80 are then operated to give a similar warning of improper operation of the boiler. At the same time, the solenoid 64 is actuated to energize the solenoid of control valve 54, permitting liquid to flow to the Sylphon bellows 28 until it is expanded and the damper 20 is closed sufficiently to decrease the amount of air admitted to the combustion chamber and restore the desired smoke condition.

Preferably in operation, the adjustments made are such as to permit a slight flow of water from the Sylphon bellows so that the bellows normally tend to contract and the damper normally tends to open. The system thus tends to increase the amount of air and decrease the amount of smoke continuously so that if either the water supply or the electrical current should be shut off the system would prevent the production of excess smoke and would "fail safe." However, the system may be adjusted to remain neutral or to fail in the opposite direction by suitable adjustments of the valves if conditions make this desirable. When adjusted to "fail safe" the signal bell operates only at infrequent intervals but often enough to advise the engineer and fireman that the system is functioning properly.

In Figure 2 of the drawings, a typical application of the invention illustrated in Figure 1 is shown as applied to a boiler 210 which may be of any conventional construction and may be provided with any adjustable fuel and air supply means such as a burner 212 for atomized or suspended fuel and an air inlet opening 214 to which air may be supplied either from a blower 216 for forced draft operation, or through suitable openings 218 in the front of the boiler for operation under natural draft. The smoke and products of combustion from the boiler pass to the stack 211 through the breaching 220 which is provided with a check damper 222 pivoted at its lower edge and normally urged to close by a weight 224.

When operating the boiler of Figure 2 under forced draft, a furnace pressure regulator 226 may be provided for actuating the check damper operating means 228 to maintain substantially constant pressure within the combustion chamber of the boiler. The operation of the fuel and air supply means may be coordinated by any suitable construction such as the regulating elements indicated diagrammatically at 230 and actuated by suitable proportioning means such as the rheostats 232 in response to variations to pressure, temperature or the like through the element 234. The elements 230, 232 and 234 and related constructions shown in Figure 2 are preferably located in a panel 240 which may be a part of the usual control board under the fireman's or engineer's inspection.

In order to maintain the desired smoke condition, smoke responsive means, such as that of Figure 1, shown diagrammatically at 236 and located in the breaching of the boiler, is employed to operate the smoke control system of Figure 1, illustrated diagrammatically at 238 in the circuit between the proportioning device 232, and the blower 216. The signal light and bell as well as the junction box of Figure 1, may also be located in the control panel 240 for indicating the smoke condition. A switch 242 may be positioned in the circuit including the smoke control system to permit control to be maintained when the furnace is operated under either forced draft or natural draft.

When the boiler is operated under forced draft, the pressure in the combustion chamber is maintained constant by furnace pressure regulator 226, while the proportioning device 232 actuates the elements 230 to maintain the desired relation between the fuel and air supplied to the combustion chamber. Upon variation in the amount of smoke passing to the stack 211, the smoke responsive means 236 serves to actuate the smoke control mechanism 238 to vary the position of damper 239 which controls the amount of air supplied by the blower 216 to the burner 212 independently of the customary related operation of the damper 239 and the fuel supply means by the mechanism 230 and the proportioning device 232.

When the switch 242 is moved to enable the boiler to be operated under natural draft, the blower 216 is deenergized and the furnace pressure regulator 226 is connected in the circuit with the proportioning device 232 and the smoke control system 238 to insure the desired air supply for combustion of the oil and the avoidance of excess smoke. Thereafter, upon variation in the amount of smoke passing to the stack, the smoke responsive device 236 serves to actuate the smoke control mechanism 238 to vary the amount of air supplied to the combustion chamber through the draft opening 218 by varying the position of the check damper 222 and thereby varying the draft and the amount of air drawn in through the openings 218, as illustrated and described in connection with the operation of damper 20 of Figure 1. Uniform operation of the boiler and the avoidance of objectionable smoke or excess air in the combustion operation is thus obtainable when operating with either forced or natural draft.

While the invention has been described above as applied to a device for controlling a boiler or a combustion apparatus in response to the amount of smoke produced, it will be evident that other types of control elements and operating means other than those shown and described, may be employed in the system and that the system may be employed in the control of apparatus of widely different character. Typical applications of the control system of the present invention as applied to other devices include the control of current flow, humidity, weight and temperature to maintain a fixed condition and to compensate for influences which may alter the functioning of apparatus. In view thereof, it should be understood that the particular embodiment of the invention herein shown and described, is intended to be illustrative of the invention and is not intended to limit the scope thereof.

I claim:

1. A control system for electrically actuated mechanism including a control circuit, an operating circuit, means for varying the amount of current flowing in said control circuit in response to change in a condition to be controlled, a galvanometer type of instrument for controlling said operating circuit having a movable coil included in the control circuit, a spring tending to rotate said coil, a fixed contact included in said operating circuit and a movable contact also included in said operating circuit and actuated by said coil to engage said fixed contact for completing said operating circuit when the amount of current flowing in said coil and tending to rotate the same fails to balance the action of said spring and means including a movable member associated with said movable contact and actuated by the flow of current in said operating circuit to immediately engage and move said movable contact to its circuit breaking position.

2. In a control system comprising a plurality of independently operable regulating elements, means for coordinating the operation of said elements to supply the demand of a variable load condition, a variable condition produced by operation of said elements, means actuated independently of said coordinating means for varying the relation of said elements to maintain said second mentioned condition within a predetermined limit, said last named means including a device responsive to change in said mentioned second condition, mechanism operable to move one of said elements relative to the other by a predetermined increment or decrement on each operation thereof, and means energizable by said responsive device for varying the frequency and character of movement by which said mechanism moves said one element relative to the other.

3. In combination with a combustion device having means for regulating the amount of fuel supplied to the device, means for regulating the amount of air supplied to the device and mechanism for coordinating the operation of said means to maintain a uniform condition, a smoke control system including means responsive to the density of the smoke produced by said device embodying an actuating member normally tending to move in one direction for actuating said air regulating means independently of the operation of said mechanism and a control member opposing the operation of said actuating member and operable incrementally in response to operation of said smoke responsive means and at a frequency corresponding to change in the density of the smoke produced to move said actuating member in the reverse direction.

4. In combination with a device having a plurality of regulating means and mechanism responsive to a variable condition for coordinating the operation of said means to supply the demand of said condition, a second variable condition produced by operation of said means, and a control system operable independently of said mechanism to maintain said second condition at a predetermined standard, said control system comprising movable means for varying the relation between said regulating means, and means responsive to said second condition for varying the frequency of movement of said movable means in proportion to the degree of change in said second condition from said predetermined standard.

5. In combination with a device having a plurality of regulating means and mechanism responsive to a variable load condition for actuating said means to supply said load, a second variable condition produced by said device, and a control system for maintaining said second condition at a predetermined standard, said control system comprising an electrical circuit, control means energizable by flow of current in said circuit for varying the relation of said regulating means independently of the operation of said mechanism, a relay for making and then breaking said circuit to momentarily energize said energizable means, and means responsive to change in said second condition for actuating said relay at a frequency corresponding to the degree of change in said second condition from said predetermined standard.

6. In combination with a combustion device having fuel supply means, air supply means and mechanism operable in response to furnace load to regulate said fuel and air supply means, means responsive to change in a combustion condition to alter the relation between said fuel and air supply means by increments or decrements with the frequency of alteration being proportional to the degree of change in said combustion condition.

7. In combination with a combustion device having fuel supply means, air supply means and mechanism operable in response to furnace load to regulate said fuel and air supply means, a control element movable step by step from one position to another independently of the operation of said mechanism for altering the relation between said fuel and air supply means, actuating means operable to move said control element one step during each cycle of operation thereof, and means responsive to change in a combustion condition to vary the frequency of operation of said actuating means in accordance with the degree of change in said combustion condition.

8. A boiler regulating system comprising fuel supply means, air supply means, mechanism for coordinating the operation of said fuel and air supply means in response to change in boiler pressure, a smoke control system including a control element operatively connected to said air supply means and movable incrementally between one position and another to actuate the air supply means independently of the operation thereof by said mechanism, control means for moving said control element one increment upon each energization of said control means, circuit means for energizing said control means, and smoke responsive means operable to make and then break said circuit means at a frequency corresponding to the density of the smoke produced above or below a predetermined standard.

9. A boiler regulating system comprising fuel supply means, air supply means, mechanism for coordinating the operation of said fuel and air supply means in response to change in boiler pressure, a smoke control system including a control element operatively connected to said air supply means and movable step by step from one position to another to actuate the same independently of the operation thereof by said mechanism, control means including an electrical circuit for actuating said control element, an instrument operable to make and then break the said circuit whereby said control means is momentarily energized to move said control element a single step, and smoke responsive means for controlling the frequency of operation of said instrument in accordance to density of smoke produced.

10. In a control system, a control element, actuating means for said control element, a control circuit including means for energizing said actuating means, an instrument operable in one direction to make and in a second direction to break said control circuit during each cycle of operation thereof, means responsive to change in a condition to be controlled for actuating said instrument in said one direction at a rate of speed corresponding to the degree of change in said condition, and a device having means operatively associated with said instrument and actuated by energization of said control circuit to engage and move said instrument in said second direction to immediately break said control circuit.

11. In a control system, a circuit including a stationary contact and a second contact movable from a predetermined position to engage said stationary contact to complete said circuit, means responsive to change in a condition for moving said second contact into engagement with said stationary contact at a rate of speed proportional to the degree of change in said condition, and means including a resetting device operative upon energization of said circuit for immediately engaging and restoring said second contact to said predetermined position, whereby said circuit is adapted to receive energizing impulses at a frequency corresponding to the degree of change in said condition.

12. In a control system, parallel operating circuits each including a separate stationary contact, contact means common to said parallel circuits and movable from a neutral position to engage either of said stationary contacts to complete the respective circuit thereof, means responsive to change in a condition above and below a predetermined standard for moving said contact means from said neutral position for engagement with either one or the other of said stationary contacts depending on whether the change in said condition is above or below said predetermined standard, and means associated with said contact means and actuatable by energization of either of said parallel circuits for immediately engaging and restoring said contact means to said neutral position, whereby one or the other of said parallel circuits is adapted to receive energizing impulses at a frequency corresponding to the degree of change in said condition above or below the predetermined standard, as the case may be.

13. In a control system, parallel operating circuits each including a separate stationary contact, contact means common to said parallel circuits and movable from a neutral position to engage either of said stationary contacts to complete the respective circuit thereof, means responsive to change in a condition above and below a predetermined standard for moving said contact means from said neutral position at a rate of speed proportional to the degree of change in said condition to engage one or the other of said stationary contacts and means associated with said contact means and operative upon the energization of either of said parallel circuits for immediately engaging and restoring said contact means to said neutral position.

14. In a smoke control system, an electrical circuit, means for varying the flow of current in said circuit in proportion to change in the density of the smoke, a second circuit including an energizable device, control means for effecting momentary energization of said device at a frequency corresponding to the degree of change in the density of smoke, said control means comprising an instrument adapted to close said second circuit upon variation of current in said first mentioned circuit from a predetermined value, and resetting means controlled by flow of current in said second circuit to operatively engage and immediately return said instrument to a circuit opening position.

15. A smoke control system including a light sensitive cell, a control circuit including said cell, a device to be controlled, an operating circuit for energizing said device, control means associated with each of the circuits for effecting momentary energization of said device at a frequency corresponding to the change in density of smoke from a predetermined standard, said control means comprising switch contacts and means operable to effect the closing of said contacts at a rate corresponding to the flow of current in said control circuit, and a device including means actuatable upon energization of said operating circuit to promptly engage said operable means to open said contacts.

16. In a system for checking the condition of a medium comprising a control circuit and an operating circuit, means for varying the amount of current flowing in said control circuit in response to variations in the medium, a relay operable at a rate of speed proportional to the change in current of said control circuit from a predetermined value to close said operating circuit, and means including a resetting device responsive to flow of current in said operating circuit to immediately engage and reset said relay to a circuit opening position corresponding to said predetermined value, whereby said operating circuit is momentarily energized at a frequency corresponding to the variation in said medium from a predetermined standard.

17. In a system for checking the condition of a medium comprising a device adapted to be energized, means controlling energization of said device including an electrical circuit, means responsive to change in the medium from a predetermined standard, an instrument including a movable switch element associated with said circuit and controlled by said responsive means for movement from a predetermined circuit opening position to a circuit closing position at a rate of speed proportional to the degree of change from said predetermined standard, and a resetting device having means immediately operative upon energization of said circuit to engage and return said element to said predetermined circuit opening position.

18. In a system comprising parallel operating circuits each including a separate stationary contact, contact means common to said parallel circuits and movable from a neutral position to engage either of said stationary contacts to complete the respective circuit thereof, means responsive to change in a condition above and below a predetermined standard for moving said contact means from said neutral position, for engagement with either one or the other of said stationary contacts depending on whether the change in said condition is above or below said predetermined standard, and means comprising a solenoid energizable upon energization of either of said parallel circuits, and clamping members operative upon energization of said solenoid to return and momentarily clamp said contact means in said neutral position.

WORRELL H. HOLBY.